No. 742,133. PATENTED OCT. 20, 1903.
H. B. SHERMAN.
NOZZLE.
APPLICATION FILED JULY 20, 1903.
NO MODEL.
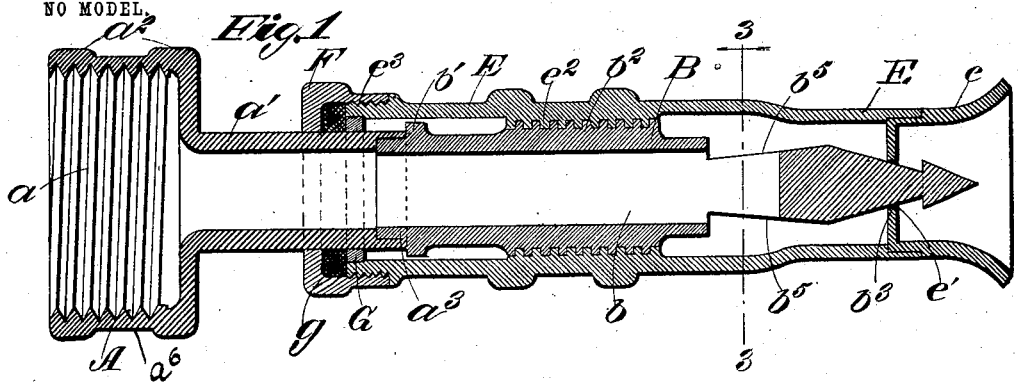
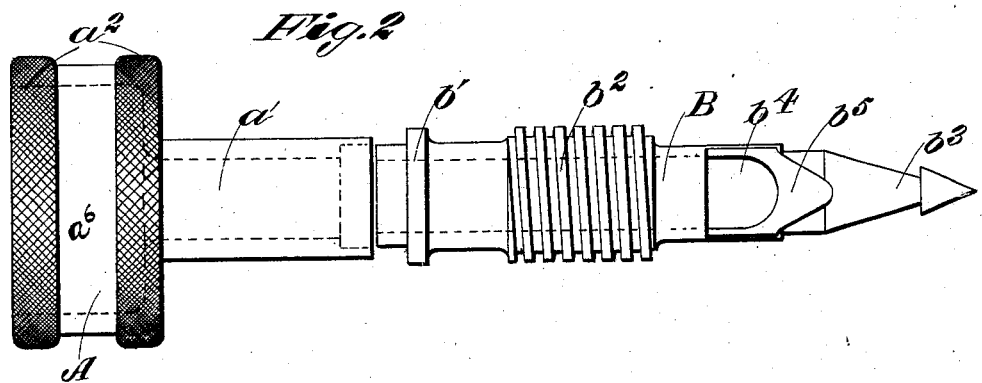
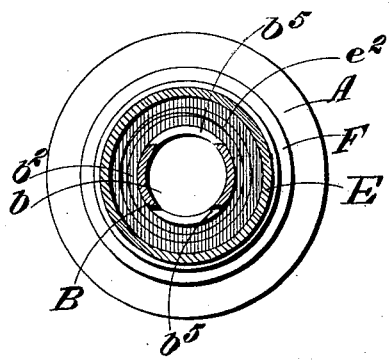
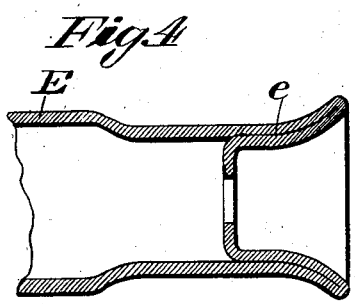
WITNESSES:
C. Edw. Duffey
James R. Mansfield
INVENTOR:
Howard B. Sherman.
by
Alexander & Dowell
Attorneys.

No. 742,133. Patented October 20, 1903.

UNITED STATES PATENT OFFICE.

HOWARD B. SHERMAN, OF BATTLECREEK, MICHIGAN, ASSIGNOR TO H. B. SHERMAN MANUFACTURING COMPANY, OF BATTLECREEK, MICHIGAN.

NOZZLE.

SPECIFICATION forming part of Letters Patent No. 742,133, dated October 20, 1903.

Application filed July 20, 1903. Serial No. 166,341. (No model.)

*To all whom it may concern:*

Be it known that I, HOWARD B. SHERMAN, of Battlecreek, in the county of Calhoun and State of Michigan, have invented certain new and useful Improvements in Nozzles; and I hereby declare that the following is a full, clear, and exact description thereof, reference being had to the accompanying drawings, which form part of this specification.

This invention is an improvement in hose-nozzles which can be used to throw streams or sprays of liquid and can be readily manipulated, so as to control the flow of the fluid or entirely cut it off.

The object of my invention is to simplify and cheapen the construction of the nozzles and at same time strengthen and lighten the same, and this is accomplished by the novel manner of manufacturing the nozzle by which a better, stronger, lighter, and more durable nozzle is produced than has heretofore been attained.

The invention resides in the novel manner of constructing the parts rather than in the form or operation thereof, and one principal feature of my invention is forming the base or hose connection of the nozzle and the spindle or valve portion thereof separately instead of integrally and afterward uniting them solidly.

Subsidiary features of the invention are making the base portion of sheet metal and the spindle portion of rod metal.

Other minor features of the invention and the advantages resulting from my novel construction of the nozzle will be hereinafter set forth in detail.

The novel features of construction will be hereinafter clearly described in connection with the drawings, and the claims following the description summarize the features of the invention for which protection is desired.

In the drawings, Figure 1 is a section through the complete nozzle. Fig. 2 is a side view of the base and spindle detached and turned at ninety degrees from the position shown in Fig. 1. Fig. 3 is an enlarged cross-section on line 3 3, Fig. 1. Fig. 4 is a detail section of a slight modification of the sleeve.

In the accompanying drawings, A designates the hose connection or base of nozzle, comprising an internally-threaded socket or base portion $a$, adapted to be screwed onto an ordinary threaded nipple attached to the end of the hose and provided with a contracted neck extension $a'$, to which the valve-spindle B is attached. Heretofore it has been customary to make the parts A B integral of cast metal; but in my construction the parts A and B are made separately, base A being preferably drawn from sheet metal and spindle B being made from rod metal. The spindle might be made by drawing; but it is better and cheaper to make it from a rod. The part A, however, is drawn or stamped from sheet metal, and the internal diameter of neck $a'$ is substantially equal to or slightly greater than that of the bore of spindle B. The waterway through neck $a'$ is much smoother than it would be if part A was cast, as such castings are not usually internally bored out or dressed. The drawn metal is also free from sand-holes and other defects common to castings. It is also a well-known fact that with a given thickness sheet metal is stronger than cast metal. Base part A can also be made cheaper out of stamped sheet metal than of cast metal, because the stamped metal is of lighter weight, owing to its greater thinness. The socket or base portion $a$ may be annularly grooved exteriorly, as at $a^6$, by cutting away the metal in a lathe, leaving exterior ribs $a^2$ at the ends of portion $a$, said ribs being preferably milled to facilitate turning part A. The extremity of neck $a'$ is shouldered to fit over the oppositely-shouldered end of spindle B, as shown at $a^3$, where the parts are firmly secured together by brazing or in other suitable manner. Spindle B is preferably made from rod metal rather than from a casting, as it has been found in practice, owing to the long slim core which is necessary in producing the spindle by casting, that the interior waterway is not perfect and is apt to be reduced by reason of irregularities of surface common to castings. Moreover, rod metal is denser, stronger, and more uniform throughout than a casting of the same dimensions would be, and it is evident that with a given outside diameter a larger bore or waterway can be obtained by using a section of a rolled rod to make spindle B than by using a casting. The spindle B is provided with an annular flange $b'$ on its end adjacent to part A, which forms a stop and bearing for the packing-ring G, hereinafter referred to. The spindle is also provided with a coarse exterior-threaded portion $b^2$, engaging a correspondingly internally threaded portion $e^2$ of the sleeve E, and on the outer end of the spindle is a pointed valve-tip $b^3$. The bore $b$ of the spindle is drilled therein and therethrough from its rear end to a point in advance of threaded part $b^2$, where it meets with a transverse slot $b^4$, through which the stream of water escapes. In the opposite sides of the spindle adjacent to the ends of slot $b^4$ are slanting cuts $b^5$, these cuts permitting part of the water to pass almost straight out of the bore when the nozzle is open, which increases the force of the stream of water escaping from the nozzle when fully opened.

The sleeve E is preferably made entirely of sheet metal, as it can be produced therefrom by drawing or stamping more cheaply than it can be produced from cast metal, and moreover will be free from sand-hole flaws and other defects incident to castings and at the same time be much lighter. The flaring mouth $e$ of the sleeve may be made from drawn metal either integrally therewith, as in Fig. 4, or separately therefrom, as in Fig. 1. When made separately therefrom, the part $e$, Fig. 1, is drawn like a cup and a hole $e'$ punched in its bottom, forming a seat for the valve $b^3$ of the spindle to work in. When part $e$ is made integral with the sleeve, (see Fig. 4,) the metal is turned back upon and within itself and is thrown out to form the bell-mouth, as shown in Fig. 4. I prefer to make the mouth portion $e$ of the sleeve separately and of greater thickness than the body of the sleeve proper except where it is threaded at $e^2$ to engage threads $b^2$ on the spindle. The rear end of sleeve E is externally shouldered and threaded, as at $e^3$, to engage with internal threads in the stuffing-box F, which is also preferably made of stamped or drawn metal for purposes of lightness and strength and is slidably fitted on neck $a'$ of part A.

Owing to the peculiar formation and connection of base A and spindle B, the stuffing-box F can have a close sliding fit on neck $a'$ instead of a loose fit, as ordinarily required, because it does not have to pass over the collar $b'$ on the spindle, but is slipped on the neck before the parts A B are united. A packing-ring G is also placed on the neck $a'$ before parts A B are united, and I am thus enabled to use a close-fitting solid packing-ring on the spindle instead of using split rings, as has been heretofore necessary in construction of these nozzles, and which split rings facilitate leakage. Preferably I place between the stuffing-box F and packing-ring G a suitable packing, such as candle-wicking or other fibrous packing, as indicated at $g$ in Fig. 1. After the stuffing-box F, packing $g$, and ring G are slipped on neck $a'$ the spindle B is secured to part A rigidly. Then sleeve E is slipped over the spindle and screwed thereon until the opening $e'$ is closed by valve-head $b^3$. Then the stuffing-box F is screwed tightly onto the end of the sleeve and will prevent the latter being screwed off the spindle, but permits it to be readily adjusted, so as to regulate the escape of water in a stream or spray, as desired. Owing to the close fit of the solid packing-ring G and the stuffing-box F on neck $a'$ and the packing $g$ between the packing-ring and stuffing-box, there will be practically no leakage between the sleeve and neck. The shoulder $b'$ prevents the packing-ring, stuffing-box, and sleeve connected therewith being withdrawn from the spindle. The threads $b^2$ being formed near shoulder $b'$ or rear end of the spindle enables the forward part of the spindle to be considerably reduced in diameter, and the surrounding portion of sleeve E can be similarly reduced in diameter and lessened in thickness, thereby effecting a saving in material and weight and at the same time maintaining the desired area of the water-way at the points mentioned.

Having thus described my invention, what I therefore claim as new, and desire to secure by Letters Patent thereon, is—

1. In a hose-nozzle, a base and spindle constructed in two parts, the base portion having a reduced tubular neck, and the spindle being suitably bored and permanently connected to the end of the neck of the base portion, with a sleeve surrounding the spindle, substantially as described.

2. In a hose-nozzle having a base and spindle constructed in two parts, said base portion having a socket and a reduced tubular cylindrical neck, and said spindle having an internal bore and an annular flange on its rear end of greater diameter than said neck; a sleeve having a threaded engagement with the spindle, a solid packing-ring and a stuffing-box fitted on the neck, said packing-ring engaging the sleeve, all substantially as described.

3. A hose-nozzle having a base and spindle constructed in two parts, said base being formed with a hose-engaging socket and a reduced tubular neck, and said spindle being attached to and forming an extension of said neck, and having a central bore and an annular flange on its rear end, a valve-head on its outer end, a transverse water-outlet slot, and external threads intermediate the slot and flange; with a stuffing-box and a solid packing-ring both closely fitted to the neck, and permanently confined thereon by the spindle-flange, and a sleeve inclosing the spindle, having a water-outlet in its front end, internal threads engaging the threads on the spindle, and its inner end threaded for attachment to the stuffing-box, all substantially as described.

4. A hose-nozzle composed of a base formed from sheet metal having a reduced tubular neck, and a spindle formed from a section of rod metal suitably bored and permanently connected to the end of the neck of the base portion, substantially as described.

5. In a hose-nozzle, a sheet-metal base having a hose-engaging socket and a reduced tubular neck; with a tubular spindle formed separately from but fastened to the end of said neck, and a sleeve inclosing the spindle and having a threaded connection therewith, substantially as described.

6. A hose-nozzle comprising a drawn-metal base having a socket portion and a reduced neck portion; a separately-formed spindle attached to said neck having an annular flange on its rear end, a central bore, a transverse slot at the outer end of the bore, slanting cuts in its sides at the ends of said slot, a tapered valve-head, and external threads intermediate the collar and slot; a stuffing-box closely but slidably fitted on the neck, a packing-ring fitted on the neck between the stuffing-box and flange, prior to the attachment of the spindle thereto, and a sleeve inclosing the spindle having its inner end threaded to engage the stuffing-box, and its outer end provided with a mouth and water-outlet opening adapted to be closed by the valve-head, and having internal threads engaging the threaded portion of the spindle, all substantially as described.

7. The herein-described hose-nozzle, comprising a drawn-metal base having an internally-threaded socket portion, and a reduced hollow neck portion, a drawn-metal stuffing-box, and a solid packing-ring closely fitted on said neck; a spindle formed separately from but rigidly attached to the extremity of the neck, having an annular flange on its inner end permanently retaining the stuffing-box and packing-ring on the neck, said spindle having a valve portion on its outer end, a transverse slot in rear of the valve portion communicating with the neck by an annular bore through the body of spindle, slanting cuts in the sides of the spindle at the ends of said slot, and external threads on the spindle intermediate the slot and collar; a sleeve inclosing the spindle, having internal threads engaging the spindle-threads, external threads on its rear end engaging the stuffing-box and a bell-mouth on its outer end provided with a valve-seat opening, all substantially as and for the purpose described.

In testimony that I claim the foregoing as my own I affix my signature in presence of two witnesses.

HOWARD B. SHERMAN.

In presence of—
EDITH M. BARNES,
FRANK M. ANDRESS.